(12) United States Patent
Miyamoto et al.

(10) Patent No.: US 11,230,631 B2
(45) Date of Patent: *Jan. 25, 2022

(54) DECORATIVE SHEET, AND TRANSPARENT RESIN SHEET

(71) Applicant: TOPPAN PRINTING CO., LTD., Tokyo (JP)

(72) Inventors: Shinichi Miyamoto, Tokyo (JP); Masashi Hattori, Tokyo (JP); Masamitsu Nagahama, Chiba (JP); Akira Sato, Chiba (JP); Masatoshi Takahashi, Chiba (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 415 days.

This patent is subject to a terminal disclaimer.

(21) Appl. No.: 15/754,250

(22) PCT Filed: Aug. 24, 2016

(86) PCT No.: PCT/JP2016/074667
§ 371 (c)(1),
(2) Date: Feb. 21, 2018

(87) PCT Pub. No.: WO2017/033971
PCT Pub. Date: Mar. 2, 2017

(65) Prior Publication Data
US 2018/0244877 A1 Aug. 30, 2018

(30) Foreign Application Priority Data

Aug. 24, 2015 (JP) .............................. JP2015-164381
Jan. 21, 2016 (JP) .............................. JP2016-009960

(51) Int. Cl.
| | | |
|---|---|---|
| C08J 5/18 | (2006.01) |
| B32B 27/32 | (2006.01) |
| B32B 27/00 | (2006.01) |
| C08J 5/10 | (2006.01) |
| B32B 27/08 | (2006.01) |
| B32B 27/20 | (2006.01) |
| B32B 27/18 | (2006.01) |
| B32B 7/12 | (2006.01) |
| B32B 27/10 | (2006.01) |
| B32B 27/26 | (2006.01) |
| C08K 5/00 | (2006.01) |
| E04F 13/18 | (2006.01) |
| E04F 13/08 | (2006.01) |

(52) U.S. Cl.
CPC .................... *C08J 5/18* (2013.01); *B32B 7/12* (2013.01); *B32B 27/00* (2013.01); *B32B 27/08* (2013.01); *B32B 27/10* (2013.01); *B32B 27/18* (2013.01); *B32B 27/20* (2013.01); *B32B 27/26* (2013.01); *B32B 27/32* (2013.01); *C08J 5/10* (2013.01); *C08K 5/0083* (2013.01); *B32B 2255/10* (2013.01); *B32B 2255/26* (2013.01); *B32B 2307/3065* (2013.01); *B32B 2307/4023* (2013.01); *B32B 2307/412* (2013.01); *B32B 2307/516* (2013.01); *B32B 2307/518* (2013.01); *B32B 2323/04* (2013.01); *B32B 2405/00* (2013.01); *C08J 2323/12* (2013.01); *C08K 2201/011* (2013.01); *E04F 13/0866* (2013.01); *E04F 13/18* (2013.01)

(58) Field of Classification Search
CPC .............. C08J 5/10; C08J 5/18; C08K 5/0083
See application file for complete search history.

(56) References Cited

U.S. PATENT DOCUMENTS

| | | | |
|---|---|---|---|
| 5,596,426 A | 1/1997 | Ueno et al. |
| 2010/0009135 A1 | 1/2010 | Hama |
| 2011/0014408 A1 | 1/2011 | Fujiwara et al. |

(Continued)

FOREIGN PATENT DOCUMENTS

| | | |
|---|---|---|
| CN | 101688005 A | 3/2010 |
| CN | 107073913 A | 8/2017 |

(Continued)

OTHER PUBLICATIONS

Extended European Search Report dated Jan. 31, 2019, in European Patent Application No. 16839318.9, 6 pages.

(Continued)

*Primary Examiner* — Peter D. Mulcahy
(74) *Attorney, Agent, or Firm* — Squire Patton Boggs (US) LLP

(57) ABSTRACT

To provide a decorative sheet including a transparent resin layer having high transparency and excellent surface scratch resistance from the viewpoint of the design properties and a transparent resin sheet. A decorative sheet (1) according to one aspect of the present invention has a transparent resin layer (4) containing a crystalline polypropylene resin as the main component, in which a value of a peak area ratio x represented by the following expression (1) of the transparent resin layer (4) is x≥0.4. Herein, S040, S130, and Sam in the following expression (1) are peak areas determined from an X-ray diffraction spectrum obtained by measuring the transparent resin layer with an X-ray diffractometer, S040 is the peak area from the Miller index (040) of polypropylene α crystals, S130 is the peak area from the Miller index (130) of the polypropylene α crystals, and Sam is the peak area of an amorphous material.

$$\text{Peak area ratio } x = \frac{(S040 + S130)}{(Sam)} \quad (1)$$

4 Claims, 1 Drawing Sheet

(56) References Cited

U.S. PATENT DOCUMENTS

| | | |
|---|---|---|
| 2016/0009880 A1 | 1/2016 | Abe et al. |
| 2018/0186132 A1 | 7/2018 | Ikeda et al. |
| 2018/0264791 A1 | 9/2018 | Miyamoto et al. |

FOREIGN PATENT DOCUMENTS

| | | |
|---|---|---|
| EP | 0 255 693 A2 | 2/1988 |
| EP | 2075127 | 7/2009 |
| EP | 3 219 488 A1 | 9/2017 |
| EP | 3 342 588 A1 | 7/2018 |
| JP | H02-128843 A | 5/1990 |
| JP | H04-83664 A | 3/1992 |
| JP | H06-001881 A | 1/1994 |
| JP | H06-198831 A | 7/1994 |
| JP | H09-328562 A | 12/1997 |
| JP | H10-58596 A | 3/1998 |
| JP | H11-179800 A | 7/1999 |
| JP | 2001-114946 A | 4/2001 |
| JP | 2001-162744 A | 6/2001 |
| JP | 2001-181411 A | 7/2001 |
| JP | 3271022 B2 | 4/2002 |
| JP | 2003-039613 A | 2/2003 |
| JP | 3772634 B | 2/2006 |
| JP | 2007-077345 A | 3/2007 |
| JP | 2007-100045 A | 4/2007 |
| JP | 2008-296962 A | 12/2008 |
| JP | 2009-013357 A | 1/2009 |
| JP | 2009-107143 A | 5/2009 |
| JP | 2010-069710 A | 4/2010 |
| JP | 2011-127013 A | 6/2011 |
| JP | 2013-122020 A | 6/2013 |
| JP | 2017-042916 A | 3/2017 |
| JP | 2017-042917 A | 3/2017 |
| WO | WO 2004/087795 A1 | 10/2004 |
| WO | WO 2008-041649 A1 | 4/2008 |
| WO | WO 2016/076360 A1 | 5/2016 |

OTHER PUBLICATIONS

International Search Report for PCT/JP2016/074667, dated Nov. 8, 2016.
Extended European Search Report dated Apr. 1, 2019 issued for European Patent Application No. 16839319.7, 8 pages.
International Search Report for International PCT application No. PCT/JP2016/074667, dated Nov. 8, 2016.
International Search Report for International PCT application No. PCT/JP2016/074668, dated Nov. 8, 2016.
Luongo, "Infrared Study of Polypropylene," J. Appl. Polm. Sci., 3:302-309, 8 pages (1960).
Non-Final Office Action for U.S. Appl. No. 15/754,272, 16 pages, dated Sep. 30, 2019.
Final Office Action for U.S. Appl. No. 15/754,272, 8 pages, dated Mar. 19, 2020.
Non-Final Office Action for U.S. Appl. No. 15/754,272, 6 pages, dated Jun. 26, 2020.

DECORATIVE SHEET, AND TRANSPARENT RESIN SHEET

TECHNICAL FIELD

The present invention relates to a decorative sheet and a transparent resin sheet.

BACKGROUND ART

As technologies relating to a decorative sheet containing an olefin-based resin drawing attention as a decorative sheet substituting a polyvinyl chloride decorative sheet, the technologies described in PTLs 1 to 6 are known, for example.

However, these decorative sheets have had a problem of hardly including a transparent resin layer having high transparency and excellent surface scratch resistance from the viewpoint of design properties.

CITATION LIST

Patent Literatures

PTL 1: JP 2-128843 A
PTL 2: JP 4-083664 A
PTL 3: JP 6-001881 A
PTL 4: JP 6-198831 A
PTL 5: JP 9-328562 A
PTL 6: JP 3772634

SUMMARY OF INVENTION

Technical Problem

The present invention aims at solving such problems. It is an object of the present invention to provide a decorative sheet including a transparent resin layer having high transparency and excellent surface scratch resistance from the viewpoint of design properties and a transparent resin sheet.

Solution to Problem

In order to achieve the object, a decorative sheet according to one aspect of the present invention includes a transparent resin layer containing a crystalline polypropylene resin as the main component, in which a value of a peak area ratio x represented by the following expression (1) of the transparent resin layer is x≥0.4.

Herein, S040, S130 and Sam in the following expression (1) are peak areas determined from an X-ray diffraction spectrum obtained by measuring the transparent resin layer by an X-ray diffractometer, S040 represents the peak area from the Miller index (040) of polypropylene α crystals, S130 represents the peak area from the Miller index (130) of the polypropylene α crystals, and Sam represents the peak area of an amorphous material.

[Expression 1]

$$\text{Peak area ratio } x = \frac{(S040 + S130)}{(Sam)} \quad (1)$$

Moreover, a decorative sheet according to another aspect of the present invention includes a transparent resin layer containing a crystalline polypropylene resin as the main component, and a value of a peak intensity ratio y represented by the following expression (2) of the transparent resin layer is y≥0.65.

Herein, I997, I938, and I973 in the following expression (2) are peak intensity values calculated from the absorption spectrum obtained by the Fourier infrared spectrometry of the transparent resin layer, I997 represents the peak intensity value at a wavenumber of 997 cm$^{-1}$, I938 represents the peak intensity value at a wavenumber of 938 cm$^{-1}$, and I973 represents the peak intensity value at a wavenumber of 973 cm$^{-1}$.

[Expression 2]

$$\text{Peak intensity ratio } y = \frac{I997 - I938}{I973 - I938} \quad (2)$$

Moreover, a transparent resin sheet according to another aspect of the present invention contains a crystalline polypropylene resin as the main component and a value of a peak area ratio x represented by the following expression (3) is x≥0.4.

Herein, S040, S130, and Sam in the following expression (3) are peak areas determined from an X-ray diffraction spectrum obtained by measuring the transparent resin layer by an X-ray diffractometer, S040 represents the peak area from the Miller index (040) of polypropylene α crystals, S130 represents the peak area from the Miller index (130) of the polypropylene α crystals, and the Sam represents the peak area of an amorphous material.

[Expression 3]

$$\text{Peak area ratio } x = \frac{(S040 + S130)}{(Sam)} \quad (3)$$

Advantageous Effects of Invention

The aspects of the present invention can provide a decorative sheet including a transparent resin layer having high transparency and excellent scratch resistance and a transparent resin sheet.

By securing high transparency in the transparent resin layer, when a pattern layer is provided in a layer lower than the transparent resin layer, for example, high transparency can be given to the pattern of the pattern layer from the viewpoint of design properties.

DESCRIPTION OF EMBODIMENTS

Figure 1:
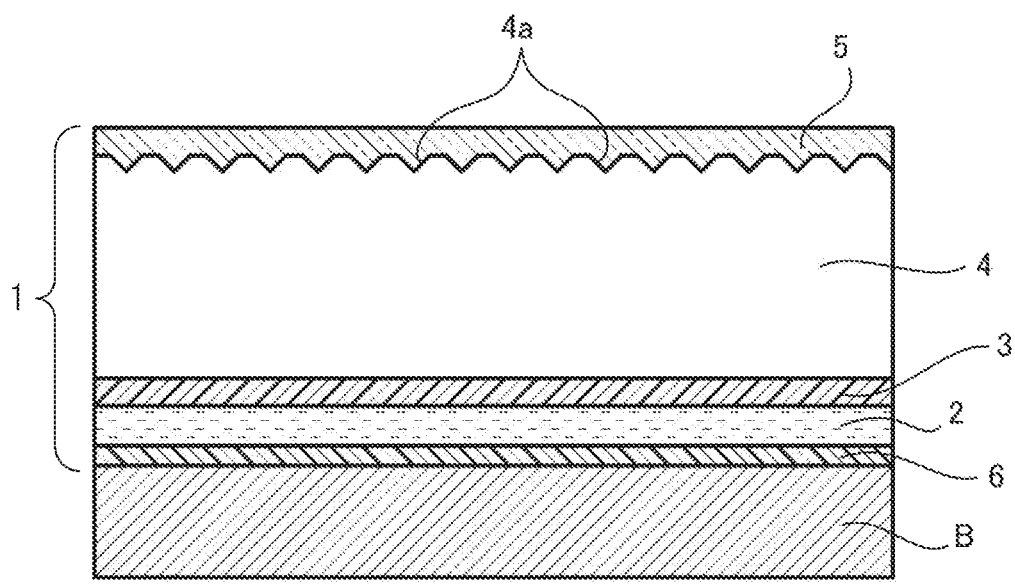
FIG. 1 is a cross-sectional view explaining a decorative sheet according to a first embodiment and a second embodiment of the present invention.

Next, each embodiment of the present invention is described with reference to the drawings.

Herein, the drawings are schematic and the relationship between the thickness and the plane dimension, the ratio of the thickness of each layer, and the like are different from the actual relationship, ratio, and the like. In addition, in order to simplify the drawings, well-known structures are illustrated by the sketch. In each figure, constituent components demonstrating the same or similar functions are designated by the same referential signs and duplicated descriptions are omitted. Each embodiment described below describes the configuration for crystallizing the technical idea of the present invention as an example and the materials, shapes, structures, and the like of constituent parts in the technical idea of the present invention are not specified by the following materials, shapes, structures, and the like. The technical idea of the present invention can be variously altered within the technical scope specified by claims described in Claims.

First Embodiment

<Transparent Resin Layer>

A decorative sheet of this embodiment is a decorative sheet including a transparent resin layer containing a crystalline polypropylene resin as the main component. In this embodiment, a case where the transparent resin layer is configured from a transparent resin sheet is described as an example. The transparent resin layer may be formed by coating.

The "containing a crystalline polypropylene resin as the main component" refers to the fact that the crystalline polypropylene resin occupies 80% by mass or more and 100% by mass or less and preferably 90% by mass or more and 100% by mass or less of a resin configuring the transparent resin layer, for example.

It is important that the transparent resin layer is prepared as a transparent resin sheet or a transparent resin sheet containing the same composition as that of the transparent resin layer is prepared and a value of a peak area ratio x calculated based on the following expression (4) from an X-ray diffraction spectrum obtained by measuring the transparent resin sheet for an X-ray diffraction by an X-ray diffractometer is set to 0.4 or more.

In Expression (4), S040 represents the peak area from the Miller index (040) of polypropylene α crystals, S130 represents the peak area from the Miller index (130) of the polypropylene α crystals, and Sam represents the peak area of an amorphous material. Herein, the peak of the Miller index (040) appears at 2θ=16.8±0.5° and the peak of the Miller index (130) appears at 2θ=18.5±0.5°, the amorphous peak appears around 2θ=15±1.0°.

[Expression 4]

$$\text{Peak area ratio } x = \frac{(S040 + S130)}{(Sam)} \quad (4)$$

Then, the transparent resin layer is set so that the peak area ratio x of the X-ray diffraction spectrum of the transparent resin sheet is 0.4 or more. It is preferable that the transparent resin layer is set so that the peak area ratio x is set within the range of 0.4 or more and 1.0 or less.

When the peak area ratio x is set to less than 0.4, the crystallization of the transparent resin layer is insufficient, and therefore a decorative sheet having desired scratch resistance cannot be obtained. On the other hand, when the peak area ratio x is set to a value larger than 1.0, an improvement of scratch resistance can be expected but, on the other hand, embrittlement of the transparent resin layer becomes remarkable and whitening occurs due to extension or bending, which impairs the design properties of the decorative sheet.

By setting the peak area ratio x within the ranges mentioned above, a decorative sheet including a transparent resin layer (transparent resin sheet) which has extremely excellent scratch resistance and in which whitening caused by extension or bending does not impair the design properties of the decorative sheet can be provided.

In the decorative sheet of this embodiment, the peak area ratio x of the transparent resin layer is set within the ranges mentioned above by controlling the film formation conditions as a process factor. In this case, the transparent resin layer is preferably formed to have a thickness of 20 μm or more and 200 μm or less. When the thickness of the transparent resin layer is less than 20 μm, there is a possibility that the scratch resistance cannot be secured. When the thickness of the transparent resin layer is larger than 200 μm, cooling in the thickness direction of the transparent resin layer is not uniformly performed, and, as a result, there is a possibility that the resin cannot be uniformly hardened. The thickness of the transparent resin layer is more preferably formed to have a thickness of 30 μm or more and 150 μm or less.

[Control of Peak Area Ratio x]

As the film formation conditions for setting the peak area ratio x within the ranges mentioned above, any condition may be acceptable insofar as the degree of crystallization of the polypropylene resin can be adjusted. In this embodiment, the degree of crystallization is adjusted by adjusting the resin temperature, the cooling temperature, the cooling time, and the like. By controlling one or two or more of these conditions, the peak area ratio x can be adjusted within the ranges mentioned above.

Herein, the resin temperature is the temperature when a resin melted in the film formation is discharged. With an increase in the resin temperature, i.e., increasing the temperature to a higher temperature, the peak area ratio x becomes larger. The cooling temperature is a temperature maintaining the temperature of the resin immediately after discharged to a fixed value equal to or lower than the melting point from the molten state for cooling. For example, in the case of the crystalline polypropylene, the cooling temperature is desirably 50° C. or more and 130° C. or less, at which the crystallization speed of the polypropylene resin is good, in order to advance the crystallization of the resin. The cooling time is the time when the resin is within the cooling temperature of ±15° C. By lengthening the passage time, the peak area ratio x becomes larger. By combining the above-described conditions, the crystallization and the crystal size in the resin can be controlled, so that the peak area ratio x can be appropriately adjusted.

[X-Ray Diffraction Measurement]

Hereinafter, the X-ray diffraction measurement is described.

First, the X-ray diffraction measurement is a measurement method for obtaining information on the ratio of crystals occupying a substance, the crystal particle size, and the crystal distortion utilizing a diffraction spectrum generated as a result of scattering of X-rays by electrons around atoms by irradiating a sample with X-rays.

A specific measurement method for the X-ray diffraction includes causing X-rays having a wavelength (0.5 Å to 3 Å) almost equal to the interval between the atoms to enter a substance, and then diffracting the X-rays by electrons belonging to each atom, and then detecting the diffracted X-rays. A graph in which the diffraction angle 2θ is plotted on the horizontal axis and the detected X-ray intensity is plotted on the vertical axis by the above-described method is referred to as the X-ray diffraction spectrum and a peculiar pattern is observed for each crystal form. In this case, since the peak intensity at a predetermined diffraction angle and the value of the peak area vary in proportion to the amount of a crystalline portion or an amorphous portion in the case of a crystalline resin, the X-ray intensity of the vertical axis can also be quantitatively analyzed from the height and the area of the peak.

In this embodiment, utilizing the above-described characteristics of the X-ray diffraction spectrum, the ratio of the sum of the peak area (S040) at diffraction angle 2θ=16.8±0.5° corresponding to the Miller index (040) of an α type crystalline portion in a polypropylene transparent resin sheet and the peak area (S130) at diffraction angle 2θ=18.5±0.5° corresponding to the Miller index (130) of the α type crystalline portion to the peak area (Sam) at diffraction angle 2θ=15±1.0° corresponding to an amorphous portion of the transparent resin sheet, i.e., the peak area ratio x showing the degree of crystallization of the polypropylene, in the X-ray diffraction spectrum obtained by the above-described measurement is calculated based on Expression (4) above. By clarifying the relationship between the peak area ratio x thus calculated and the scratch resistance of the transparent resin sheet (transparent resin layer) and using the transparent resin layer corresponding to the transparent resin sheet having the peak area ratio x within the range mentioned above, a decorative sheet excellent in scratch resistance is provided. The peak area of the Miller index (040) corresponding to the crystal portion, the peak area of the Miller index (130), and the peak area corresponding to the amorphous portion are calculated after performing background correction.

[Nucleating Agent]

It is preferable that a nano-sized nucleating agent is added to the transparent resin layer. In particular, it is preferable that a nano-sized nucleating agent is added in the form of a nucleating agent vesicle in which the nucleating agent is encapsulated in a vesicle having a monolayer outer membrane.

By adding the nucleating agent vesicle to the polypropylene resin to thereby increase the degree of crystallization of the polypropylene resin, a transparent resin sheet having extremely high transparency can be obtained.

[Method for Producing Nucleating Agent Vesicle]

The nucleating agent vesicle can be produced by a supercritical reverse phase evaporation method, for example.

The supercritical reverse phase evaporation method is a method for producing a nano-sized vesicle (capsule) encapsulating a target substance using carbon dioxide in a supercritical state or under the temperature conditions equal to or higher than the critical point or under the pressure conditions equal to or higher than the critical point. The carbon dioxide in the supercritical state means carbon dioxide in the supercritical state equal to or higher than the critical temperature (30.98° C.) and the critical pressure (7.3773±0.0030 MPa). The carbon dioxide under the temperature conditions equal to or higher than the critical point or under the pressure conditions equal to or higher than the critical point means carbon dioxide under the conditions where only the critical temperature or only the critical pressure exceeds the critical conditions.

Specifically, an aqueous phase is injected into a mixed fluid containing the carbon dioxide in the supercritical state, phospholipid, and a nucleating agent as an encapsulated substance, and then stirred, whereby an emulsion containing the carbon dioxide in the supercritical state and the aqueous phase is generated. Thereafter, when the pressure is reduced, the carbon dioxide expands and evaporates to cause phase transition, and then a nanovesicle in which the phospholipid covers the surface of nucleating agent nanoparticles with a monolayer membrane is generated. According to the supercritical reverse phase evaporation method, a vesicle with a single layer membrane can be generated, and therefore a vesicle of an extremely small size can be obtained.

The average particle diameter of the nucleating agent vesicle encapsulating the nano-sized nucleating agent is preferably ½ or less of a visible light wavelength (400 nm to 750 nm) and more specifically 200 nm to 375 nm or less. The nucleating agent vesicle is present in a state where the outer membrane of the vesicle is broken and the nano-sized nucleating agent is exposed in a resin composition. By setting the particle diameter of the nucleating agent to the minimum size within the range mentioned above to thereby suppress the scattering of light, a transparent resin layer having high transparency can be realized.

The nucleating agent is not particularly limited insofar as it is a substance serving as the starting point of crystallization when a resin is crystallized. For example, a phosphoric acid ester metal salt, a benzoic acid metal salt, a pimelic acid metal salt, a rosin metal salt, benzylidene sorbitol, quinacridone, cyanine blue, talc, and the like may be used. In particular, it is preferable to use a phosphoric acid ester metal salt, a benzoic acid metal salt, a pimelic acid metal salt, and a rosin metal salt which can be expected to have transparency in this embodiment.

Examples of the phospholipid include glycerophospholipids, such as phosphatidylcholine, phosphatidiethanolamine, phosphatidylserine, phosphatidic acid, phosphatidyl glycerol, phosphatidyl inositol, cardiopine, egg yolk lecithin, hydrogenated egg yolk lecithin, soy lecithin, and hydrogenated soy lecithin, and sphingophospholipids, such as sphingomyelin, ceramide phosphorylethanolamine, and ceramide phosphorylglycerol.

[Crystalline Polypropylene Resin]

The crystalline polypropylene resin is not particularly limited. It is preferable to use a high crystalline homopolypropylene resin which is a homopolymer of propylene containing 95% or more and more preferably 96% or more of a pentad fraction (mmmm fraction).

The pentad fraction (mmmm fraction) is calculated from a numerical value (electromagnetic wave absorption rate) obtained by resonating a resin composition configuring the transparent resin layer at a predetermined resonant frequency by a $^{13}$C-NMR measurement method (nuclear magnetic resonance measurement method) using a carbon C (nuclide) having amass number of 13. The pentad fraction (mmmm fraction) prescribes the atomic arrangement, the electronic structure, and the fine structure of molecules in the resin composition. The pentad fraction of the polypropylene resin is a ratio in which five propylene units are arranged determined by the $^{13}$C-NMR and is used as the scale of the degree of crystallization or the stereoregularity. Such a pentad fraction is one of the important factors mainly determining the surface scratch resistance. Basically, when the pentad fraction is higher, the degree of crystallization of a sheet becomes higher, and therefore the scratch resistance is improved.

<Configuration of Decorative Sheet>

Hereinafter, a specific example of the configuration of the decorative sheet of this embodiment is described with reference to FIG. 1 and FIG. 2.

Decorative Sheet of First Embodiment

FIG. 1 illustrates the configuration of a decorative sheet 1 of this embodiment. The configuration of the decorative sheet 1 is formed by successively laminating a primer layer 6, a concealing layer 2 as a base material layer, a pattern printed layer 3, a transparent resin layer 4, and a topcoat layer 5 from a substrate B side to which the decorative sheet 1 is stuck. Examples of the substrate B include wooden boards (wood-based base material), inorganic boards (composite plate), metal plates, and the like, for example.

[Primer Layer 6]

Materials of the primer layer 6 can be selected as appropriate from nitrocotton, cellulose, a vinyl chloride-vinyl acetate copolymer, polyvinyl butyral, polyurethane, acrylic, and polyester type, and the like alone or modified products thereof as a binder to be used. These may be any of aqueous, solvent, and emulsion types. A curing method can also be selected as appropriate from a one-part type which is cured alone, a two-part type using a curing agent together with a main agent, a type which is cured by irradiation with ultraviolet rays, electron beams, and the like to be used. As a general curing method, a two-part type which is cured by using an isocyanate-based curing agent in combination with a urethane-based main agent is used. This method is suitable from the viewpoint of workability, cost, and aggregation force of a resin itself. In addition to the binders mentioned above, colorants, such as pigments or dyes, extenders, solvents, various additives, and the like are added, for example. In particular, the primer layer 6 is located on the rearmost surface of the decorative sheet 1. Therefore, when considering winding the decorative sheet 1 as a continuous plastic film (web shape), it is required to avoid the occurrence of blocking, such as difficulty of sliding or non-peeling, due to sticking of films, and it is required to increase the adhesion with an adhesive. Therefore, inorganic fillers, such as silica, alumina, magnesia, titanium oxide, and barium sulfate, for example, may be added to the primer layer 6. The layer thickness is preferably set within the range of 0.1 μm to 3.0 μm because it is an object to secure the adhesiveness with the substrate B.

[Concealing Layer 2]

As materials of the concealing layer 2 as a base material layer, materials for use in the primer layer 6 are basically usable. However, when the concealing properties are regarded as important, titanium oxide, iron oxide, and the like which are opaque pigments, for example, are preferably used as a pigment. In order to further increase the concealing properties, it is also suitable to add metals, such as gold, silver, copper, and aluminum, for example. In general, aluminum of a flake shape is added in many cases. The concealing layer 2 can be formed using the materials mentioned above by a comma coater, a knife coater, a lip coater, metal vapor deposition, or a sputtering method. When the layer thickness of the concealing layer 2 is less than 2 μm, the concealing properties are insufficient. When the layer thickness exceeds 10 μm, the aggregation force of a resin material as the main component decreases. Therefore, it is appropriate to set the thickness to 2 μm to 10 μm.

[Pattern Printed Layer 3]

Also as materials of the pattern printed layer 3, the same materials as those of the primer layer 6 are usable. Examples of pigments having high versatility include condensed azo, insoluble azo, quinacridone, isoindoline, anthraquinone, imidazolone, cobalt, phthalocyanine, carbon, titanium oxide, iron oxide, and pearl pigments, such as mica, and the like, for example. The pattern printed layer 3 can be formed by performing gravure printing, offset printing, screen printing, flexo printing, electrostatic printing, ink jet printing, and the like to the transparent resin layer 4 using the materials mentioned above. Moreover, besides a method including applying an ink containing a mixture of the binder and the pigment mentioned above to form the pattern printed layer 3, a pattern can be formed by vapor deposition or sputtering of various metals.

[Transparent Resin Layer 4]

The transparent resin layer 4 is configured containing the crystalline polypropylene resin as the main component as described above. To the transparent resin layer 4, various additives, such as existing heat stabilizers, flame retardants, UV absorbers, light stabilizers, antiblocking agents, catalyst scavengers, colorants, light scattering agents, and gloss regulators, are added as necessary.

In this embodiment, the transparent resin sheet 4 obtained by molding the resin composition of the composition described above into a sheet shape is used as the transparent resin layer 4.

In particular, in the decorative sheet 1 of this embodiment, the transparent resin sheet 4 in which the peak area ratio x calculated based on Expression (4) above from the X-ray diffraction spectrum obtained by performing measurement by an X-ray diffractometer is set to 0.4 or more by controlling molding processing conditions is used. In this case, the thickness of the transparent resin sheet 4 is set to 20 μm to 200 μm, for example. Specific examples of the molding processing conditions include temperature conditions, such as the melting temperature of the resin composition and the extrusion temperature and the roll temperature relating to the film formation, and conveyance conditions, such as the sheet winding speed, and the like. In this embodiment, controlling the temperature conditions and the conveyance conditions adjust the cooling rate in the film formation to thereby adjust the degree of crystallization of the transparent resin sheet 4. Accordingly, the peak area ratio x is set to 0.4 or more. Preferably, the peak area ratio x is set to $0.4 \leq x \leq 1.0$.

Furthermore, the nucleating agent vesicle is added to the resin composition configuring the transparent resin sheet 4. Thus, the degree of crystallization of the resin composition can be easily increased, and thus the transparent resin sheet 4 extremely excellent in transparency can be obtained.

As the heat stabilizers, a phenol type, a sulfur type, a phosphorus type, a hydrazine type, and the like are usable, for example. As the flame retardants, aluminum hydroxide, magnesium hydroxide, and the like are usable, for example. As the UV absorbers, a benzotriazole type, a benzoate type, a benzophenone type, a triazine type, and the like are usable, for example. As the light stabilizers, a hindered amine type and the like are usable, for example.

[Topcoat Layer 5]

Materials of the topcoat layer 5 can be selected as appropriate from a polyurethane type, an acrylic type, an acryl silicon type, a fluorine type, an epoxy type, a vinyl type, a polyester type, a melamine type, an aminoalkyd type, a urea type, and the like, for example, to be used. The form of the materials is also not particularly limited and may be an aqueous, an emulsion, a solvent type, and the like. A curing method can also be selected as appropriate from a one-part type which is cured alone, a two-part type using a curing agent together with a main agent, a type which is cured by irradiation with ultraviolet rays, electron beams, and the like to be used. In particular, one which is cured by mixing an isocyanate-based curing agent with a urethane-based main agent is suitable from the viewpoint of workability, cost, and aggregation force of a resin itself.

[Film Formation Method for the Transparent Resin Sheet 4]

Herein, a detailed film formation flow of the transparent resin sheet 4 is described. First, pellets of the resin composition in which the existing various additives are added as described above to the crystalline polypropylene resin as the main component are charged into a melting extruder. Thereafter, the pellets are kneaded under heating to be melted into a liquid, and then the liquid resin composition is extruded with a predetermined width from a T die provided in an extrusion orifice towards a cooling roll provided on the downstream side. In this case, the liquid resin composition extruded from the T die contacts the cooling roll to be quenched to a cooling temperature, and then the crystallization advances while conveyed at a temperature around the cooling temperature. The cooling roll is rotating at a predetermined rotation speed around the central axis of the roll. The resin composition contacting the cooling roll is formed into the transparent resin sheet 4 having a sheet shape, conveyed at a predetermined conveyance speed to the downstream side, and finally wound by a winding roll. In this embodiment, in order to set the peak area ratio x of the transparent resin sheet 4 to be obtained within a predetermined range, the temperature of the resin composition extruded from the melting extruder, the temperature of the cooling roll, and the sheet conveyance speed as the film formation conditions are adjusted.

[Method for Producing Decorative Sheet 1]

The decorative sheet 1 of this embodiment is formed by successively laminating the pattern printed layer 3, the concealing layer 2, and the primer layer 6 using the above-described materials by the above-described method on one surface of the transparent resin sheet 4 formed by the film formation flow. When an emboss pattern 4a is provided on the transparent resin layer 4, the transparent resin sheet 4 is pressed using a die roll for embossing to give the emboss pattern 4a to the other surface of the transparent resin sheet 4. Furthermore, the topcoat layer 5 is formed on the surface of the emboss pattern 4a to obtain the decorative sheet 1.

In the decorative sheet 1 of this embodiment, it is desirable that the primer layer 6 is set to 0.1 µm to 3.0 µm, the concealing layer 2 is set to 2 µm to 10 µm, the pattern printed layer 3 is set to 3 µm to 20 µm, the transparent resin sheet 4 as the transparent resin layer 4 is set to 20 µm to 200 µm, and the topcoat layer 5 is set to 3 µm to 20 µm and it is suitable that the total thickness of the decorative sheet 1 is set within the range of 30 µm to 250 µm.

Decorative Sheet According to Modification of this Embodiment

Figure 2:
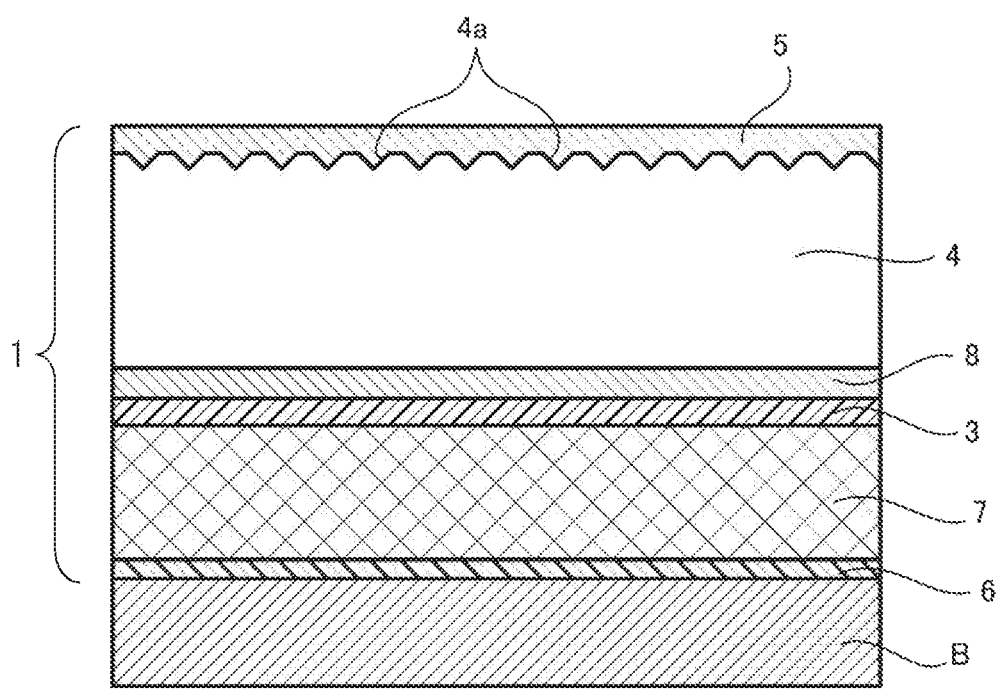
FIG. 2 is a cross-sectional view explaining a decorative sheet according to modifications of the first embodiment and the second embodiment of the present invention.

FIG. 2 illustrates the structure of a modification of the decorative sheet 1 of this embodiment. The configuration of the decorative sheet 1 according to this modification is formed by successively laminating the primer layer 6, the primary film layer 7 as a base material layer, the pattern printed layer 3, an adhesive layer 8, the transparent resin layer 4, and the topcoat layer 5 from the substrate B side to which the decorative sheet 1 is stuck. Examples of the substrate B include wooden boards, inorganic boards, metal plates, and the like, for example.

For the primer layer 6, the pattern printed layer 3, the transparent resin layer 4, and the topcoat layer 5, those having the same configurations as those of the first embodiment are usable. Therefore, descriptions of the layers described above are omitted herein.

[Primary Film Layer 7]

The primary film layer 7 as a base material layer is a sheet-shaped member. The primary film layer 7 can be arbitrarily selected from paper, such as thin paper, titanium paper, and resin impregnated paper, synthetic resin, such as polyethylene, polypropylene, polybutylene, polystyrene, polycarbonate, polyester, polyamide, an ethylene-vinyl acetate polymer, polyvinyl alcohol, and acrylic resin or a foam of the synthetic resin mentioned above, rubber, such as ethylene-propylene polymer rubber, ethylene-propylene-diene copolymer rubber, styrene-butadiene copolymer rubber, styrene-isoprene-styrene block copolymer rubber, and polyurethane, organic or inorganic nonwoven fabrics, synthetic paper, metallic foil, such as aluminum, iron, gold, and silver, and the like, for example, to be used. When the primary film layer 7 containing a polyolefin-based resin as the main component is used as the primary film layer 7, the surface is inactive. Therefore, it is preferable to perform surface activation treatment to both surfaces of the primary film layer 7 by corona treatment, plasma treatment, ozonization treatment, electron beam treatment, UV treatment, dichromic acid treatment, and the like. Furthermore, also between the primary film layer 7 and the pattern printed layer 3, the primer layer 6 may be provided in order to secure sufficient adhesiveness. When concealing properties are to be given to the decorative sheet 1, concealing properties may be given by providing the concealing layer 2 or adding an opaque pigment or the like to the primary film layer 7 itself.

[Adhesive Layer 8]

The adhesive layer 8 can be selected from an acrylic type, a polyester type, a polyurethane type, and the like, for example, to be used. In general, a two-part type material containing a urethane-based polyol as the main agent and isocyanate as a curing agent is used from workability, cost, and high aggregation force.

[Method for Producing Decorative Sheet 1 of this Modification]

In the decorative sheet 1 of this modification, first, corona treatment is performed to both surfaces of the primary film layer 7 as a base material layer, and then the primer layer 6 is formed on one surface of the primary film layer 7 and the pattern printed layer 3 is formed on the other surface. Then, the transparent resin sheet 4 as the transparent resin layer 4 formed by the above-described film formation flow and the surface on the side of the pattern printed layer 3 of the primary film layer 7 on which the pattern printed layer 3 and the primer layer 6 are formed are bonded to each other with the adhesive layer 8 interposed between the layers using methods employing hot pressing, e.g., an extrusion lamination method, a dry lamination method, and the like, to be laminated. Thus, a laminated film is formed. In this case, when the emboss pattern 4a is provided on the surface of the transparent resin layer 4, the emboss pattern 4a is formed on the laminated film by a method employing hot pressing or a method employing a cooling roll on which irregularities are formed.

Finally, the topcoat layer 5 is provided on the surface of the transparent resin layer 4 of the laminated film to obtain the decorative sheet 1.

In the decorative sheet 1 of this modification, it is desirable that the primary film layer 7 is set to 100 µm to 250 µm considering printing workability, cost, and the like, the adhesive layer 8 is set to 1 µm to 20 µm, the transparent resin layer 4 is set to 20 µm to 200 µm, and the topcoat layer 5 is set to 3 µm to 20 µm and it is suitable that the total thickness of the decorative sheet 1 is set within the range of 130 µm to 500 µm.

<Advantageous Effects of this Embodiment>

(1) In the decorative sheet 1 of this embodiment, with respect to the transparent resin sheet 4 as the transparent resin layer 4, the crystalline polypropylene resin is contained as the main component and the value of the peak area ratio x calculated based on Expression (4) above from the X-ray diffraction spectrum obtained by the X-ray diffraction measurement is set within the range of x≥0.4 and more preferably x≥0.5. It is more preferable that the value of the peak area ratio x is set within the range of 0.4≤x≤1.0.

According to this configuration, the decorative sheet 1 including the transparent resin layer having high transparency and excellent surface scratch resistance, as compared with former decorative sheets, from the viewpoint of design properties can be provided.

(2) Moreover, in the decorative sheet 1 of this embodiment, the nano-sized nucleating agent is added to the resin composition configuring the transparent resin sheet 4.

Since the nucleating agent has a nano size, the transparency is secured even when the nucleating agent is added.

Furthermore, the nano-sized nucleating agent is added in the form of the nucleating agent vesicle in which the nano-sized nucleating agent is encapsulated in a vesicle having a monolayer outer membrane.

According to this configuration, high dispersibility of the nucleating agent is realized in the resin composition and the degree of crystallization of the resin composition is increased by the nucleating agent, and thus the decorative sheet 1 including the transparent resin sheet 4 having higher transparency can be provided.

EXAMPLES

Hereinafter, specific Examples of the decorative sheet 1 of the present invention are described.

Examples 1-1 to 1-6, Comparative Examples 1-1 and 1-2

In Examples 1-1 to 1-6 and Comparative Examples 1-1 and 1-2 for comparison, a resin composition in which 500 PPM of a hindered phenolic antioxidant (Irganox 1010, manufactured by BASF A.G.), 2000 PPM of a benzotriazole-based UV absorber (Tinuvin 328, manufactured by BASF A.G.), 2000 PPM of a hindered amine-based light stabilizer (Chimassorb 944, manufactured by BASF A.G.), and 1000 PPM of a phosphoric acid ester metal salt-based nucleating agent (Adekastab NA-21, manufactured by ADEKA CORPORATION) were added to a high crystalline homopolypropylene resin was subjected to the above-described film formation flow using a melting extruder. Thus, the transparent resin sheets 4 having a thickness of 100 μm to be used as the transparent resin layer 4 were individually formed.

In this case, Examples 1-1 to 1-6 and Comparative Examples 1-1 and 1-2 were individually produced by controlling the peak area ratio x. The peak area ratios x of the produced transparent resin sheets of Examples 1-1 to 1-6 and Comparative Examples 1-1 and 1-2 are shown in Table 1.

For the X-ray diffraction spectrum measurement, the measurement was performed by a parallel method using an X-ray diffractometer RINT TTRIII (manufactured by Rigaku Corporation). For an X-ray source, Cu was used and diffracted X-rays were measured with a scintillation counter.

Examples 1-7 to 1-11

In Examples 1-7 to 1-11, a resin composition in which 500 PPM of a hindered phenolic antioxidant (Irganox 1010, manufactured by BASF A.G.), 2000 PPM of a benzotriazole-based UV absorber (Tinuvin 328, manufactured by BASF A.G.), 2000 PPM of a hindered amine-based light stabilizer (Chimassorb 944, manufactured by BASF A.G.), and 1000 PPM of a nucleating agent vesicle were added to a high crystalline homopolypropylene resin was subjected to the above-described film formation flow using a melting extruder. Thus, the transparent resin sheets 4 having a thickness of 100 μm to be used as the transparent resin layer 4 were individually formed. The peak area ratios x of the obtained transparent resin sheets 4 are shown in Table 1.

As the added nucleating agent vesicle, a nucleating agent vesicle in which a phosphoric acid ester metal salt-based nucleating agent was encapsulated in a vesicle having a monolayer outer membrane was obtained by placing 100 parts by mass of methanol, 82 parts by mass of a phosphoric acid ester metal salt-based nucleating agent (Adekastab NA-21, manufactured by ADEKA CORPORATION), and 5 parts by mass of phosphatidylcholine in a high-pressure stainless steel container kept at 60° C., followed by sealing, injecting carbon dioxide so that the pressure was 20 MPa to achieve a supercritical state, injecting 100 parts by mass of ion exchanged water while vigorously stirring and mixing the resultant substance, performing stirring for 15 minutes in a state where the temperature and the pressure in the container were held, and then discharging the carbon dioxide to return the pressure to the atmospheric pressure. The particle diameter of the obtained nucleating agent vesicle had a size in the range of 0.05 μm to 0.8 μm.

Subsequently, corona treatment was performed to both surfaces of the transparent resin sheets 4 of Examples 1-1 to 1-11 and Comparative Examples 1-1 and 1-2 obtained by the above-described method to set the surface wet tension to 40 dyn/cm or more. Moreover, pattern printing was performed to one surface of the transparent resin sheet 4 with a two-part curable urethane ink (V180, manufactured by TOYO INK MFG. CO., LTD.) to form the pattern printed layer 3 and a two-part curable urethane ink (V180, manufactured by TOYO INK MFG. CO., LTD.) having concealing properties was applied in an overlapping manner to the pattern printed layer 3 with an application amount of 6 g/m² to form the concealing layer 2. Moreover, a two-part curable urethane ink (PET-E, Reducer, manufactured by Dainichiseika Color & Chemicals Mfg. Co., Ltd.) was applied in an overlapping manner to the concealing layer 2 with an application amount of 1 g/m² to form the primer layer 6. Thereafter, pressing was performed to the other surface of the transparent resin sheet 4 using a die roll for embossing to give the emboss pattern 4a. Then, a two-part curable urethane topcoat (W184, manufactured by DIC Graphics Corporation) was applied to the surface of the emboss pattern 4a formed as described above with an application amount of 3 g/m² to obtain the decorative sheet 1 having a total thickness of 110 μm illustrated in FIG. 1.

<Evaluation>

The decorative sheets 1 of Examples 1-1 to 1-11 and Comparative Examples 1-1 and 1-2 obtained by the above-described method were subjected to a coin scratch evaluation test for evaluating scratch resistance, a haze value measurement test for evaluating the transparency, and a bending whitening test for evaluating the post processability.

Hereinafter, a detailed method of each test is described.

<Coin Scratch Evaluation Test>

First, in the coin scratch evaluation test, a coin was fixed to the surface of each decorative sheet 1 obtained by the above-described method using a jig in a state where the coin was caused to abut on the surface, the coin was slid at a fixed speed while applying 1, 2, 3, or 4 kg load to the jig, and then it was examined whether the surface of the decorative sheet 1 was scratched to evaluate the scratch resistance.

In this evaluation test, there is a possibility that the decorative sheet 1 is utilized to a portion where a load is remarkably applied, such as a floor, and therefore the decorative sheet 1 which was not scratched with a 2 kg or more load was judged to be accepted.

<Haze Value Measurement Test>

Herein, the haze value is a value obtained by, when light entering from one surface of an object is emitted to the other surface, dividing a value (diffuse transmittance), which is obtained by subtracting an integrated value (straight line transmittance) of only a straight line component among light beams emitted from the other surface from an integrated value (total light transmittance) of all light beams emitted from the other surface, with the total light transmittance is expressed by percentage. A smaller value indicates that the transparency is higher. The haze value is determined by an internal haze determined by the internal state of the object, such as a degree of crystallization and spherocrystal size in a crystal portion, and an external haze determined by the surface state of the object, such as the presence of irregularities of the incident surface and the emission surface. In this evaluation test, when simply referred to as the haze value, the haze value means a value determined by the internal haze and the external haze. This evaluation test was performed for each transparent resin sheet 4 using a haze value measurement tester (manufactured by Nippon Denshoku Industries Co., LTD.; NDH2000). Blank measurement is performed beforehand in a state where nothing is attached to a sample holder. In the measurement of each transparent resin sheet 4, a sample was attached to the sample holder, a sample transmission measurement was performed under the same conditions as those of the blank measurement, and then a value expressing the ratio of the sample transmission measurement to the blank measurement by percentage was calculated as the haze value. Then, in the present invention, the transparent resin sheet 4 having a haze value of less than 15% was judged to be accepted.

<Bending Whitening Test>

In the bending whitening test, the decorative sheet was stuck to a woody building decorative material, such as MDF, using an appropriate adhesive, a linear groove was cut so as to reach an about 5 µm portion immediately under of the decorative sheet from an end surface towards the opposite end surface of the woody building decorative material in the rear surface of a decorative sheet attachment surface, the decorative sheet was bent at 90° along the groove together with the woody building decorative material, and then the presence of whitening impairing the design properties of the decorative sheet was judged. The bending whitening evaluation was performed by a visual function evaluation and the results are shown in Table 1.

<Marks of Appearance Changes>

◯: No whitening occurred or slight whitening occurred.

x: Whitening or cracking occurred.

The coin scratch evaluation test results, the haze value measurement test results, and the bending whitening evaluation test results of Examples and Comparative Examples are shown in Table 1.

TABLE 1

|  | Peak area ratio x | Coin scratch evaluation | Haze value (%) | Bending whitening evaluation | Judgement |
|---|---|---|---|---|---|
| Comp. Ex. 1-1 | 0.11 | 1 kg or less | 16.0 | ◯ | x |
| Comp. Ex. 1-2 | 0.17 | 1 kg or less | 15.2 | ◯ | x |
| Ex. 1-1 | 0.41 | 2 kg | 13.7 | ◯ | ◯ |
| Ex. 1-2 | 0.44 | 3 kg | 13.2 | ◯ | ◯ |
| Ex. 1-3 | 0.43 | 3 kg | 13.0 | ◯ | ◯ |
| Ex. 1-4 | 0.51 | 4 kg | 11.6 | ◯ | ◯ |
| Ex. 1-5 | 0.49 | 4 kg | 11.4 | ◯ | ◯ |
| Ex. 1-6 | 0.45 | 3 kg | 10.9 | ◯ | ◯ |
| Ex. 1-7 | 0.67 | 4 kg | 8.4 | ◯ | ◯ |
| Ex. 1-8 | 0.62 | 4 kg | 8.1 | ◯ | ◯ |
| Ex. 1-9 | 0.82 | 4 kg | 7.2 | ◯ | ◯ |
| Ex. 1-10 | 0.91 | 4 kg | 6.8 | ◯ | ◯ |
| Ex. 1-11 | 1.12 | 4 kg | 6.9 | x | x |

As understood from Table 1, it was clarified that the decorative sheets 1 of Examples 1-1 to 1-11 in which the peak area ratio x of the transparent resin sheet 4 is set to $x \geq 0.4$ are not scratched even in the coin scratch test in which a 2 kg or more load was applied and the haze value is also 14% or less, and thus the decorative sheets 1 have very excellent scratch resistance and transparency. On the other hand, the decorative sheets 1 of Comparative Examples 1-1 and 1-2 in which the peak area ratio x of the transparent resin sheet 4 is set to $x < 0.4$ are remarkably scratched in the coin scratch test in which a 1 kg load was applied and the haze value is 15.1% or more, and thus the decorative sheets 1 had poor scratch resistance and transparency.

Moreover, it is found that, in Examples 1-7 to 1-11 in which a nucleating agent vesicle was added, the haze value is as very low as 8.4% or less, and thus Examples 1-7 to 1-11 have excellent transparency even when compared with other Examples and Comparative Examples.

Moreover, the transparent resin layer of Example 1-11 in which x was $x > 1.0$ was accepted in the coin scratch evaluation and the haze value but whitening occurred in the bending whitening test.

From the results above, it was clarified that, by setting the peak area ratio x of the transparent resin sheet 4 as the transparent resin layer 4 to 0.4 or more and preferably $0.4 \leq x \leq 1.0$, the decorative sheet 1 which is excellent in scratch resistance and transparency and in which whitening caused by extension or bending does not impair the design properties of the decorative sheet can be obtained.

In the column of "Judgment" of Table 1, the decorative sheet excellent in post-processing resistance and transparency is marked with "◯" and the decorative sheet poor in post-processing resistance and transparency is marked with "x".

Moreover, it was clarified that, by adding the nucleating agent vesicle to the transparent resin sheet 4 to increase the dispersibility of the nucleating agent in the transparent resin sheet 4, the decorative sheet 1 having extremely high transparency and excellent design properties can be obtained.

The decorative sheet 1 of the present invention is not limited to the above-described embodiments and Examples and can be variously altered insofar as the features of the invention are not impaired.

Second Embodiment

<Transparent Resin Layer>

A decorative sheet of this embodiment is a decorative sheet including a transparent resin layer containing a crystalline polypropylene resin as the main component. This embodiment describes a case where the transparent resin layer is configured from a transparent resin sheet as an example. The transparent resin layer may be formed by coating.

The "containing a crystalline polypropylene resin as the main component" refers to the fact that the crystalline polypropylene resin occupies 80% by mass or more and 100% by mass or less and preferably 90% by mass or more and 100% by mass or less of a resin configuring the transparent resin layer, for example.

It is important that the transparent resin layer is prepared as a transparent resin sheet or a transparent resin sheet containing the same composition as that of the transparent resin layer is prepared and a value of a peak intensity ratio y calculated based on the following Expression (5) from the absorption spectrum obtained by the Fourier infrared spectrometry of the transparent resin sheet is set to y≥0.65.

In Expression (5), I997 represents the peak intensity value at a wavenumber of 997 $cm^{-1}$, I938 represents the peak intensity value at a wavenumber of 938 $cm^{-1}$, and I973 represents the peak intensity value at a wavenumber of 973 $cm^{-1}$.

[Expression 5]

$$\text{Peak intensity ratio } y = \frac{I997 - I938}{I973 - I938} \quad (5)$$

Then, the transparent resin layer is set so that the peak intensity ratio y of the absorption spectrum of the transparent resin sheet is 0.65 or more. The peak intensity ratio y is preferably 0.65≤y≤0.85. By setting the peak intensity ratio y within the ranges mentioned above, the decorative sheet including the transparent resin layer extremely excellent in scratch resistance can be provided.

In the decorative sheet of this embodiment, the peak intensity ratio y of the transparent resin layer is set within the ranges mentioned above by controlling the film formation conditions as a process factor. In this case, the transparent resin sheet is preferably formed to have a thickness of 20 µm or more and 200 µm or less. This is because, when the thickness of the transparent resin sheet is smaller than the thickness within the ranges mentioned above, the scratch resistance cannot be secured and, when the thickness of the transparent resin sheet is larger than the thickness within the ranges mentioned above, cooling in the thickness direction of the resin sheet is not uniformly performed, and, as a result, the resin cannot be uniformly hardened. The thickness of the transparent resin layer is preferably formed to have a thickness of 30 µm or more and 150 µm or less.

[Control of Peak Intensity Ratio y]

As the film formation conditions for setting the peak intensity ratio y within the ranges mentioned above, any condition may be acceptable insofar as the degree of crystallization of the polypropylene resin can be adjusted. In this embodiment, the degree of crystallization is adjusted by adjusting the resin temperature, the cooling temperature, the cooling time, and the like. By controlling one or two or more of these conditions, the peak intensity ratio y can be adjusted within the ranges mentioned above.

More specifically, the resin temperature is the temperature when a resin melted in the film formation is discharged. With an increase in the resin temperature (increasing the temperature to a higher temperature), the peak intensity ratio y becomes larger. The cooling temperature is a temperature cooling the discharged resin. With an increase in the cooling temperature (increasing the temperature to a higher temperature), the peak intensity ratio y becomes larger. With respect to the cooling time, by lengthening the passage time around the crystallization temperature (100 to 130° C.) of the polypropylene resin, the peak intensity ratio y becomes larger. By combining the above-described conditions to thereby control the crystallization and the crystal size in the resin, the peak intensity ratio y can be appropriately adjusted.

[Fourier Infrared Spectrometry]

Hereinafter, the Fourier infrared spectrometry is described.

First, the infrared spectrometry is a measurement method for obtaining information on the chemical structure and state of a substance by measuring an infrared light absorbed into the substance utilizing the principle that the amount of an infrared light of a wavelength of 0.7 µm to 1000 µm absorbed into the substance varies based on vibration or rotational mode of the molecules of the substance.

In particular, the wavelength range referred to as a mid infrared ray having a wavelength of 2.5 to 4 µm in which the spectrum peculiar to a substance appears is mainly used.

As a specific measurement method for the Fourier infrared spectrometry, light (infrared light) emitted from a light source is caused to obliquely enter an interferometer through a beam splitter to be split into a transmitted light and a reflected light. The transmitted light and the reflected light are reflected with a fixed mirror and a moving mirror to return to the beam splitter to be synthesized again to be an interference wave. An optical path difference varies depending on the position where the moving mirror moves, and therefore different interference waves are obtained.

By emitting the different interference waves to a sample, and then calculating the intensity of light of each wavenumber component from the signal intensity of the transmitted light or the reflected light from the sample, the infrared spectrum is measured. In particular, in this embodiment, the calculation of the interference wave was performed using a Fourier transformation method and the measurement was performed by the Fourier infrared spectrometry which is a method measuring the infrared spectrum. A graph in which the wavenumber obtained by the above-described method is plotted on the horizontal axis and the measured absorbance (or transmittance) is plotted on the vertical axis is referred to as an infrared absorption spectrum (or infrared transmission spectrum) and a pattern peculiar to each sample is observed. In this case, with respect to the absorbance of the vertical axis, the peak intensity value at a predetermined wavenumber varies in proportion to the concentration or the thickness of the sample and the amount of a crystalline portion or an amorphous portion in the case of a crystalline resin, and therefore quantitative analysis can also be performed from the height and the area of the peak.

In this embodiment, utilizing the above-described characteristics of the infrared absorption spectrum, the ratio of the peak intensity at a wavenumber of 997 $cm^{-1}$ corresponding to the absorbance of a crystalline portion of the polypropylene transparent resin sheet to the peak intensity at a wavenumber of 973 $cm^{-1}$ corresponding to the absorbance of an amorphous portion of the transparent resin sheet, i.e., the peak intensity ratio y showing the degree of crystallization of polypropylene, in the absorption spectrum obtained by the above-described measurement is calculated based on Expression (5) above. By clarifying the relationship between the calculated peak intensity ratio y and the scratch resistance of the transparent resin sheet and using the transparent resin layer corresponding to the transparent resin sheet having the peak intensity ratio y within the ranges mentioned above, the decorative sheet excellent in scratch resistance is provided. The peak intensity at a wavenumber of 997 cm$^{-1}$ and the peak intensity at a wavenumber of 973 cm$^{-1}$ each are subjected to background correction using the peak intensity at a wavenumber of 938 cm$^{-1}$.

[Nucleating Agent]

It is preferable in the decorative sheet of this embodiment that a nano-sized nucleating agent is added to the transparent resin sheet as the transparent resin layer. As the nucleating agent to be used in this embodiment, the same nucleating agent as that described in the first embodiment is usable. Therefore, descriptions of the nucleating agent and a method for producing a nucleating agent vesicle are omitted herein.

[Crystalline Polypropylene Resin]

The crystalline polypropylene resin of this embodiment is not particularly limited and the same one as the crystalline polypropylene resin described in the first embodiment is usable. Therefore, a description of the crystalline polypropylene resin is omitted herein.

<Configuration of Decorative Sheet>

Hereinafter, a specific example of the configuration of the decorative sheet of this embodiment is described with reference to FIG. 1 and FIG. 2.

Decorative Sheet of Second Embodiment

FIG. 1 illustrates the configuration of the decorative sheet 1 of this embodiment. The configuration of the decorative sheet 1 is formed by successively laminating a primer layer 6, a concealing layer 2, a pattern printed layer 3, a transparent resin layer 4, and a topcoat layer 5 from a substrate B side to which the decorative sheet 1 is stuck. Examples of the substrate B include wooden boards, inorganic boards, metal plates, and the like, for example. More specifically, the decorative sheet 1 of this embodiment has the same configuration as that the decorative sheet 1 of the first embodiment.

For the primer layer 6, the concealing layer 2, the pattern printed layer 3, and the topcoat layer 5 of this embodiment, the same layers as the layers described in the first embodiment are usable. Therefore, descriptions of the layers described above are omitted.

[Transparent Resin Layer 4]

In this embodiment, the transparent resin sheet 4 obtained by molding the resin composition of the composition described above into a sheet shape is used as the transparent resin layer 4.

In particular, the transparent resin sheet 4 in which the peak intensity ratio y calculated based on Expression (5) above from the infrared absorption spectrum measured by the Fourier infrared spectrometry is set to y≥0.65 by controlling the molding processing conditions is preferably used in the decorative sheet 1 of this embodiment. In this case, the thickness of the transparent resin sheet 4 is set to 20 μm to 200 μm, for example. Specific examples of the molding processing conditions include temperature conditions, such as the melting temperature of the resin composition and the extrusion temperature and the roll temperature relating to the film formation, the conveyance conditions, such as the sheet winding speed, and the like. In this embodiment, by controlling the temperature conditions and the conveyance conditions to adjust the cooling rate in film formation to adjust the degree of crystallization of the transparent resin sheet 4, the peak intensity ratio y is set to y≥0.65 and preferably 0.65≤y≤0.85.

To the transparent resin layer 4 of this embodiment, various additives, such as existing heat stabilizers, flame retardants, UV absorbers, light stabilizers, antiblocking agents, catalyst scavengers, colorants, light scattering agents, and gloss regulators, may be added as necessary as with the transparent resin layer 4 of the first embodiment.

Furthermore, a nucleating agent vesicle may be added to the resin composition configuring the transparent resin layer 4. Thus, the degree of crystallization of the resin composition can be easily increased, and the transparent resin sheet 4 extremely excellent in transparency can be obtained.

For the heat stabilizers, the flame retardants, the ultraviolet ray absorbers, and the light stabilizers of this embodiment, the same agents as the agents described in the first embodiment are usable. Therefore, descriptions of the agents described above are omitted herein.

[Method for Forming Transparent Resin Sheet 4]

A method for forming the transparent resin sheet 4 of this embodiment is the same as the method for forming the transparent resin sheet 4 described in the first embodiment. Therefore, a description thereof is omitted herein. In this embodiment, in order to set the peak intensity ratio y of the transparent resin sheet 4 to be obtained within a predetermined range, the temperature of the resin composition extruded from a melting extruder, the temperature of a cooling roll, and the sheet conveyance speed as the film formation conditions are adjusted.

[Method for Producing Decorative Sheet 1]

The configuration of the method for forming the decorative sheet 1 of this embodiment is the same as that of the method for forming the decorative sheet 1 described in the first embodiment. Therefore, a description thereof is omitted herein.

In the decorative sheet 1 of this embodiment, it is desirable that the primer layer 6 is set to 0.1 μm to 3.0 μm, the concealing layer 2 is set to 2 μm to 10 μm, the pattern printed layer 3 is set to 3 μm to 20 μm, the transparent resin sheet 4 as the transparent resin layer 4 is set to 20 μm to 200 μm, and the topcoat layer 5 is set to 3 μm to 20 μm and it is suitable that the total thickness of the decorative sheet 1 is set within the range of 30 μm to 250 μm.

Decorative Sheet According to Modification of this Embodiment

FIG. 2 illustrates the configuration of a modification of the decorative sheet 1 of this embodiment. The configuration of the decorative sheet 1 according to this modification is formed by successively laminating the primer layer 6, the primary film layer 7, the pattern printed layer 3, the adhesive layer 8, the transparent resin layer 4, and the topcoat layer 5 from the substrate B side to which the decorative sheet 1 is stuck. Examples of the substrate B include wooden boards, inorganic boards, metal plates, and the like, for example. More specifically, the decorative sheet 1 of this modification has the same configuration as that of the decorative sheet 1 of the modification described in the first embodiment.

For the primer layer 6, the pattern printed layer 3, the transparent resin layer 4, and the topcoat layer 5, those having the same configurations as those of the first embodiment are usable. For the primary film layer 7 and the adhesive layer 8, those having the same configurations as those of the modification described in the first embodiment are usable. Therefore, a description of each layer described above is omitted herein.

[Method for Producing Decorative Sheet 1 of this Modification]

A method for forming the decorative sheet 1 of this modification has the same configuration as that of the method for forming the decorative sheet 1 described in the modification of the first embodiment. Therefore, a description thereof is omitted herein.

Moreover, the thickness of each layer configuring the decorative sheet 1 of this modification is the same as that of each layer of the decorative sheet 1 described in the modification of the first embodiment. Therefore, a description of the thickness of each layer described above is omitted herein.

<Advantageous Effects of this Embodiment>

(1) In the decorative sheet 1 of this embodiment, with respect to the transparent resin sheet 4 as the transparent resin layer 4, the value of the peak intensity ratio y calculated based on Expression (5) above from the absorption spectrum obtained in the Fourier infrared spectrometry is set within the range of y≥0.65 and more preferably 0.65≤y≤0.85.

According to this configuration, the decorative sheet 1 including the transparent resin layer having high transparency and excellent surface scratch resistance, as compared with former decorative sheets, from the viewpoint of design properties can be provided.

(2) Moreover, in the decorative sheet 1 of this embodiment, the nano-sized nucleating agent is added to the resin composition configuring the transparent resin sheet 4.

Since the nucleating agent has a nano size, the transparency is secured even when the nucleating agent is added.

Furthermore, the nano-sized nucleating agent is added in the form of the nucleating agent vesicle in which the nano-sized nucleating agent is encapsulated in a vesicle having a monolayer outer membrane.

According to this configuration, high dispersibility of the nucleating agent is realized in the resin composition and the degree of crystallization of the resin composition is increased by the nucleating agent, and thus the decorative sheet 1 including the transparent resin sheet 4 having higher transparency can be provided.

EXAMPLES

Hereinafter, specific Examples of the decorative sheet 1 of the present invention are described.

Examples 2-1 to 2-6, Comparative Examples 2-1 and 2-2

In Examples 2-1 to 2-6 and Comparative Examples 2-1 and 2-2, a resin composition in which 500 PPM of a hindered phenolic antioxidant (Irganox 1010, manufactured by BASF A.G.), 2000 PPM of a benzotriazole-based UV absorber (Tinuvin 328, manufactured by BASF A.G.), 2000 PPM of a hindered amine-based light stabilizer (Chimassorb 944, manufactured by BASF A.G.), and 1000 PPM of a phosphoric acid ester metal salt-based nucleating agent (Adekastab NA-21, manufactured by ADEKA CORPORATION) were added to a high crystalline homopolypropylene resin was subjected to the above-described film formation flow using a melting extruder. Thus, the transparent resin sheets 4 having a thickness of 100 μm to be used as the transparent resin layer 4 were individually formed. The peak intensity ratios y of the obtained transparent resin sheets 4 are shown in Table 2.

Examples 2-7 to 2-10

In Examples 2-7 to 2-10, a resin composition in which 500 PPM of a hindered phenolic antioxidant (Irganox 1010, manufactured by BASF A.G.), 2000 PPM of a benzotriazole-based UV absorber (Tinuvin 328, manufactured by BASF A.G.), 2000 PPM of a hindered amine-based light stabilizer (Chimassorb 944, manufactured by BASF A.G.), and 1000 PPM of a nucleating agent vesicle were added to a high crystalline homopolypropylene resin was subjected to the above-described film formation flow using a melting extruder. Thus, the transparent resin sheets 4 having a thickness of 100 μm to be used as the transparent resin layer 4 were individually formed. The peak intensity ratios y of the obtained transparent resin sheets 4 are shown in Table 2.

As the added nucleating agent vesicle, a nucleating agent vesicle in which a phosphoric acid ester metal salt-based nucleating agent was encapsulated in a vesicle having a monolayer outer membrane was obtained by placing 100 parts by mass of methanol, 82 parts by mass of a phosphoric acid ester metal salt-based nucleating agent (Adekastab NA-21, manufactured by ADEKA CORPORATION), and 5 parts by mass of phosphatidylcholine in a high-pressure stainless steel container kept at 60° C., followed by sealing, injecting carbon dioxide so that the pressure was 20 MPa to achieve a supercritical state, injecting 100 parts by mass of ion exchanged water while vigorously stirring and mixing the resultant substance, performing stirring for 15 minutes in a state where the temperature and the pressure in the container were held, and then discharging the carbon dioxide to return the pressure to the atmospheric pressure. The particle diameter of the obtained nucleating agent vesicle had a size of 0.05 μm to 0.8 μm.

Subsequently, corona treatment was performed to both surfaces of the transparent resin sheets 4 of Examples 2-1 to 2-10 and Comparative Examples 2-1 and 2-2 obtained by the above-described method to set the surface wetting tension to 40 dyn/cm or more. Moreover, pattern printing was performed to one surface of the transparent resin sheet 4 with a two-part curable urethane ink (V180, manufactured by TOYO INK MFG. CO., LTD.) to form the pattern printed layer 3 and a two-part curable urethane ink (V180, manufactured by TOYO INK MFG. CO., LTD.) having concealing properties was applied in an overlapping manner to the pattern printed layer 3 with an application amount of 6 g/m² to form the concealing layer 2. Moreover, a two-part curable urethane ink (PET-E, Reducer, manufactured by Dainichiseika Color & Chemicals Mfg. Co., Ltd.) was applied in an overlapping manner to the concealing layer 2 with an application amount of 1 g/m² to form the primer layer 6. Thereafter, pressing was performed to the other surface of the transparent resin sheet 4 using a die roll for embossing to give the emboss pattern 4a. A two-part curable urethane topcoat (W184, manufactured by DIC Graphics Corporation) was applied to the surface of the emboss pattern 4a formed as described above with an application amount of 3 g/m² to obtain the decorative sheet 1 having a total thickness of 110 μm illustrated in FIG. 1.

<Evaluation>

The decorative sheets 1 of Examples 2-1 to 2-10 and Comparative Examples 2-1 and 2-2 obtained by the above-described method were subjected to a coin scratch evaluation test for evaluating scratch resistance and a haze value measurement test for evaluating the transparency. The obtained results of the coin scratch evaluation test and the haze value measurement test are shown in Table 2.

The coin scratch evaluation test and the haze value measurement test used in the examples are the same as the coin scratch evaluation test and the haze value measurement test described in the first embodiment. Therefore, descriptions of the tests are omitted herein.

TABLE 2

| | Peak intensity ratio y | Coin scratch evaluation | Haze value (%) | Judgement |
|---|---|---|---|---|
| Comp. Ex. 2-1 | 0.60 | 1 kg or less | 16.0 | x |
| Comp. Ex. 2-2 | 0.63 | 1 kg or less | 15.2 | x |
| Ex. 2-1 | 0.65 | 2 kg | 13.7 | o |
| Ex. 2-2 | 0.68 | 3 kg | 13.2 | o |
| Ex. 2-3 | 0.70 | 3 kg | 13.0 | o |
| Ex. 2-4 | 0.73 | 4 kg | 11.6 | o |
| Ex. 2-5 | 0.75 | 4 kg | 11.4 | o |
| Ex. 2-6 | 0.80 | 3 kg | 10.9 | o |
| Ex. 2-7 | 0.67 | 4 kg | 8.4 | o |
| Ex. 2-8 | 0.72 | 4 kg | 8.1 | o |
| Ex. 2-9 | 0.82 | 4 kg | 7.2 | o |
| Ex. 2-10 | 0.85 | 4 kg | 6.8 | o |
| | y > 0.85 | Film cannot be formed. | | x |

With respect to the evaluation test results of the decorative sheets 1, as shown in Table 2, it was clarified that the decorative sheets 1 of Examples 2-1 to 2-10 in which the peak intensity ratio y of the transparent resin sheet 4 is set to y≥0.65 are not scratched even in the coin scratch test in which a 2 kg or more load was applied and the haze value is also 14% or less, and thus the decorative sheets 1 have very excellent scratch resistance and transparency. The transparent resin sheet 4 in which y is set to y>0.85 was not able to form a film. The decorative sheets 1 of Comparative Examples 2-1 and 2-2 in which the peak intensity ratio y of the transparent resin sheet 4 is set to y<0.65 are remarkably scratched in the coin scratch test in which a 1 kg load was applied and the haze value is also 15.1% or more, and thus the decorative sheets 1 had poor scratch resistance and transparency.

Moreover, it is found that, in Examples 2-7 to 2-10 in which a nucleating agent vesicle was added, the haze values are as very low as 8.4%, 8.1%, 7.2%, and 6.8%, and thus the decorative sheets 1 have excellent transparency.

From the above results, it was clarified that, by setting the peak intensity ratio y of the transparent resin sheet 4 as the transparent resin layer 4 to y≥0.65 and preferably 0.65≤x≤0.85, the decorative sheet 1 excellent in scratch resistance and transparency can be obtained.

In the column of "Judgment" of Table 2, the decorative sheet excellent in scratch resistance and transparency is marked with "o" and the decorative sheet poor in scratch resistance and transparency is marked with "x".

Moreover, it was clarified that, by adding the nucleating agent vesicle to the transparent resin sheet 4 to increase the dispersibility of the nucleating agent in the transparent resin sheet 4, the decorative sheet 1 having extremely high transparency and excellent design properties can be obtained.

The decorative sheet 1 of the present invention is not limited to the above-described embodiments and Examples and can be variously altered insofar as the features of the invention are not impaired.

Reference Example

Hereinafter, a decorative sheet other than the decorative sheets described in the embodiments of the present invention is briefly described as a reference example of the present invention.

Heretofore, as illustrated in PTLs 1 to 5, a large number of decorative sheets containing an olefin-based resin have been proposed as a decorative sheet substituting a polyvinyl chloride decorative sheet.

These decorative sheets do not contain a vinyl chloride resin, and therefore can prevent the generation of poisonous gas or the like in incineration.

However, the decorative sheets described in PTLs 1 to 5 contain a common polypropylene sheet or soft polypropylene sheet, and therefore the surface scratch resistance has been poor and the scratch resistance has been much inferior to the scratch resistance of the polyvinyl chloride decorative sheet.

Then, the present inventors have proposed a decorative sheet excellent in surface scratch resistance and post processability as in described in PTL 6 in order to overcome these defects.

However, the use of a decorative board using the decorative sheet having such performance has increasingly expanded and the consciousness of consumers to the quality has also increasingly increased, and therefore the decorative sheet has been demanded to be further improved in surface scratch resistance and post-processing resistance against V-groove bending processing and the like.

In general, the crystalline resin, such as polypropylene, can change mechanical properties by controlling the degree of crystallization which is a ratio of a crystalline component to an amorphous component in the resin. Factors for controlling the degree of crystallization include material factors, such as the molecular structure of the resin itself, addition of a nucleating agent, and the like, and process factors, such as molding processing conditions in processing the crystalline resin. The present inventors have conducted extensive studies particularly focusing on the process factors in the present invention to complete a decorative sheet including a transparent resin layer in which the range of the degree of crystallization in which the scratch resistance is excellent is specified by controlling the process factors.

REFERENCE SIGNS LIST 1 decorative sheet
2 concealing layer
3 pattern printed layer
4 transparent resin layer (transparent resin sheet)
4a emboss pattern
5 topcoat layer
6 primer layer
7 primary film layer
8 adhesive layer

The invention claimed is:
1. A decorative sheet comprising:
a transparent resin layer containing a crystalline polypropylene resin as a main component,
a nano-sized nucleating agent contained in the transparent resin layer,
the nano-sized nucleating agent is contained in the transparent resin layer in a state where the nucleating agent is encapsulated in a vesicle having a monolayer outer membrane,
wherein
a value of a peak area ratio x represented by a following expression (1) of the transparent resin layer is x≥0.4,
S040, S130 and Sam in the following expression (1) are peak areas calculated from an X-ray diffraction spectrum obtained by measuring the transparent resin layer by an X-ray diffractometer using Cu for an X-ray source, S040 represents a peak area from a Miller index (040) of polypropylene α crystals, S130 represents a peak area from a Miller index (130) of the polypropylene α crystals, and Sam represents a peak area of an amorphous material,

[Expression 1]

$$\text{Peak area ratio } x = \frac{(S040 + S130)}{(Sam)}, \quad (1)$$

and a concealing layer containing aluminum of a flake disposed on a side of the transparent resin layer.

2. The decorative sheet according to claim 1, wherein the peak area ratio x is 0.4≤x≤1.0.

3. A decorative sheet comprising:
a transparent resin layer containing a crystalline polypropylene resin as a main component,
a nano-sized nucleating agent contained in the transparent resin layer,
the nano-sized nucleating agent is contained in the transparent resin layer in a state where the nucleating agent is encapsulated in a vesicle having a monolayer outer membrane, wherein a value of a peak intensity ratio y represented by a following expression (2) of the transparent resin layer is y≥0.65, I997, I938, and I973 in the following expression (2) are peak intensity values calculated from an absorption spectrum obtained by Fourier infrared spectrometry of the transparent resin layer, I997 represents a peak intensity value at a wavenumber of 997 $cm^{-1}$, I938 represents a peak intensity value at a wavenumber of 938 $cm^{-1}$, and I973 represents a peak intensity value at a wavenumber of 973 $cm^{-1}$,

[Expression 2]

$$\text{Peak intensity ratio } y = \frac{I997 - I938}{I973 - I938}, \quad (2)$$

and a concealing layer containing aluminum of a flake disposed on a side of the transparent resin layer.

4. The decorative sheet according to claim 3, wherein the peak intensity ratio y is 0.65≤y≤0.85.

* * * * *